(12) United States Patent
Kaita et al.

(10) Patent No.: US 9,074,035 B2
(45) Date of Patent: *Jul. 7, 2015

(54) COPOLYMER OF CONJUGATED DIENE COMPOUND AND NON-CONJUGATED OLEFIN, RUBBER COMPOSITION, CROSS-LINKED RUBBER COMPOSITION AND TIRE

(75) Inventors: Shojiro Kaita, Nerima-ku (JP); Olivier Tardif, Shimoniikura (JP); Yasuo Horikawa, Kodaira (JP); Hideki Kitano, Yoshikawa (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1 day.

This patent is subject to a terminal disclaimer.

(21) Appl. No.: 13/813,277

(22) PCT Filed: Jul. 26, 2011

(86) PCT No.: PCT/JP2011/004225
§ 371 (c)(1),
(2), (4) Date: Apr. 5, 2013

(87) PCT Pub. No.: WO2012/014455
PCT Pub. Date: Feb. 2, 2012

(65) Prior Publication Data
US 2013/0197157 A1   Aug. 1, 2013

(30) Foreign Application Priority Data

Jul. 30, 2010 (JP) ................................. 2010-173153
Feb. 4, 2011 (JP) ................................. 2011-023409

(51) Int. Cl.
| C08F 36/00 | (2006.01) |
| C08L 9/00 | (2006.01) |
| C08F 236/04 | (2006.01) |
| B60C 1/00 | (2006.01) |
| C08L 47/00 | (2006.01) |
| C08F 210/02 | (2006.01) |
| C08F 236/06 | (2006.01) |
| C08K 3/00 | (2006.01) |

(52) U.S. Cl.
CPC ............... *C08F 236/04* (2013.01); *B60C 1/00* (2013.01); *C08L 47/00* (2013.01); *C08F 210/02* (2013.01); *C08F 236/06* (2013.01); *C08K 3/0033* (2013.01)

(58) Field of Classification Search
USPC .......................................................... 526/335
See application file for complete search history.

(56) References Cited

U.S. PATENT DOCUMENTS

| 2003/0018144 A1* | 1/2003 | Kaita et al. ..................... 526/134 |
| 2009/0182104 A1* | 7/2009 | Thuilliez et al. .............. 526/126 |
| 2010/0190940 A1 | 7/2010 | Nakagawa et al. |
| 2011/0136995 A1* | 6/2011 | Nakagawa et al. ........... 526/126 |

FOREIGN PATENT DOCUMENTS

| EP | 1086957 A1 | 3/2001 |
| EP | 2599805 A1 | 6/2013 |
| JP | 9-291121 A | 11/1997 |
| JP | H09291121 A | 11/1997 |
| JP | 2000-86857 A | 3/2000 |
| JP | 2000-95903 A | 4/2000 |
| JP | 2000-154210 A | 6/2000 |
| JP | 2000-256423 A | 9/2000 |
| JP | 2000256423 A | 9/2000 |
| JP | 2006-503141 A | 1/2006 |
| JP | 2006-249442 A | 9/2006 |
| JP | 2008-280384 A | 11/2008 |
| JP | 2008280384 A * | 11/2008 |
| WO | 2008/146643 A1 | 12/2008 |
| WO | 2008146643 A1 | 12/2008 |
| WO | 2012/014456 A1 | 2/2012 |
| WO | 2012/014463 A1 | 2/2012 |

OTHER PUBLICATIONS

Translation of JP2008-280384, Nov. 2008.*
International Search Report for PCT/JP2011/004225 dated Sep. 13, 2011.
Extended European Search Report issued Feb. 7, 2014 in European Patent Application No. 11812057.5.
First Office Action issued Mar. 5, 2014 in corresponding Chinese Patent Application No. 201180047685.X with English translation.
Office Action dated Aug. 1, 2014 from the State Intellectual Property Office of P.R. China in Chinese Patent Application No. 201180047685.X.
Communication dated Oct. 14, 2014, issued by the Japanese Patent Office in corresponding Japanese Application No. 2012526316.
Communication dated Mar. 17, 2015 issued from the Japanese Patent Office in corresponding Japanese Application No. 2012-526316.

* cited by examiner

*Primary Examiner* — Hui Chin
(74) *Attorney, Agent, or Firm* — Sughrue Mion, PLLC

(57) ABSTRACT

In a copolymer of a conjugated diene compound and a non-conjugated olefin, the conjugated diene unit has a cis-1,4 bond content of greater than 70.5% and the non-conjugated olefin is contained in an amount of 10 mol % or more.

14 Claims, No Drawings

COPOLYMER OF CONJUGATED DIENE COMPOUND AND NON-CONJUGATED OLEFIN, RUBBER COMPOSITION, CROSS-LINKED RUBBER COMPOSITION AND TIRE

CROSS REFERENCE TO RELATED APPLICATIONS

This application is a National Stage of International Application No. PCT/JP2011/004225 filed Jul. 26, 2011, claiming priority based on Japanese Patent Application Nos. 2010-173153 filed Jul. 30, 2010 and 2011-023409 filed Feb. 4, 2011, the contents of all of which are incorporated herein by reference in their entirety.

TECHNICAL FIELD

The present invention relates to a copolymer of a conjugated diene compound and a non-conjugated olefin, a rubber composition, a crosslinked rubber composition, and a tire, and more particularly, to such a copolymer of a conjugated diene compound and a non-conjugated olefin that is used for manufacturing rubber having good crack growth resistance and good weather resistance (ozone resistance) and that contains a cis-1,4 bond in the conjugated diene unit (the unit derived from the conjugated diene compound), a rubber composition containing the copolymer, a crosslinked rubber composition obtained by crosslinking the rubber composition, and a tire manufactured by using the rubber composition or the crosslinked rubber composition.

BACKGROUND ART

It is well known that coordination anionic polymerization using catalyst systems represented by a Ziegler-Natta catalyst allows for homopolymerization of olefins and dienes. However, it was difficult to provide efficient copolymerization of olefins and dienes using such polymerization reaction systems.

Particularly, applying a copolymer of a conjugated diene and a non-conjugated olefin to the compounded rubber results in fewer double bonds in the conjugated diene unit (the unit derived from the conjugated diene compound) in the copolymer as compared with conjugated polymers, and therefore, improved ozone resistance. In addition, one of the characteristics other than ozone resistance required when a rubber composition is applied to various applications (such as tires, conveyor belts or anti-vibration rubber) includes good crack growth resistance.

For example, JP 2000-154210 A (PTL 1) discloses a catalyst for polymerizing conjugated dienes that contains a transition metal compound of group IV of the periodic table having cyclopentadiene ring structure, and also refers to an α-olefin such as ethylene as an exemplary monomer copolymerizable with this conjugated diene. However, PTL 1 does not provide a specific description of copolymerization of a conjugated diene compound and a non-conjugated olefin. Obviously, there is no description or suggestion of improving crack growth resistance by controlling cis content and cis-1,4 bond content to be greater than 70.5%. Moreover, there is no description or suggestion of improving weather resistance by controlling the content of the non-conjugated olefin (the unit derived from the non-conjugated olefin) to be 10 mol % or more.

For example, JP 2006-249442 A (PTL 2) discloses a catalyst for polymerizing olefins that consists of a transition metal compound such as a titanium compound and a promoter, and also discloses a copolymer of an α-olefin and a conjugated diene compound. However, specific manufacture and use were ensured only if the non-conjugated olefin, α-olefin, is contained in an amount within a range of 66.7 mol % to 99.1 mol %. That is, PTL 2 does not provide any specific description or suggestion of the conjugated diene compound/non-conjugated olefin copolymer containing the non-conjugated olefin (the unit derived from the non-conjugated olefin) in an amount of 0 mol % to 50 mol %, or of improving crack growth resistance by controlling the cis content and cis-1,4 bond content to be greater than 70.5%. Moreover, PTL 2 does not provide any description or suggestion of improving weather resistance by controlling the content of the non-conjugated olefin (the unit derived from the non-conjugated olefin) to be 10 mol % or more.

In addition, JP 2006-503141 A (PTL 3) discloses a copolymer of ethylene and butadiene resulting from synthesizing ethylene and butadiene as starting materials using a special organic metal complex as a catalytic component. However, the copolymer of PTL 3 has a structure different from that of the copolymer of the present invention in that butadiene, which is a monomer, is inserted in the copolymer in the form of trans-1,2-cyclohexane. In addition, specific manufacture and use were ensured only if the non-conjugated olefin, ethylene, is contained in an amount within a range of 69.6 mol % to 89.0 mol %. In this case, the ethylene content was determined by 100 mol % minus the molar content of those units derived from butadiene with a known molar content. That is, PTL 3 does not also provide any specific description or suggestion of the conjugated diene compound/non-conjugated olefin copolymer containing the non-conjugated olefin (the unit derived from the non-conjugated olefin) in an amount of 0 mol % to 50 mol %, or of improving crack growth resistance by controlling the cis content and cis-1,4 bond content to be greater than 70.5%. Moreover, PTL 3 does not provide any description or suggestion of improving weather resistance by controlling the content of the non-conjugated olefin (the unit derived from the non-conjugated olefin) to be 10 mol % or more.

In addition, JP 2000-086857 A (PTL 4) discloses a butadiene polymer having cis content of 92% and ethylene content of 3% or 9%. However, PTL 4 does not provide any description or suggestion of improving weather resistance by controlling the content of the non-conjugated olefin (the unit derived from the non-conjugated olefin) to be 10 mol % or more.

CITATION LIST

Patent Literature

PTL 1: JP 2000-154210 A
PTL 2: JP 2006-249442 A
PTL 3: JP 2006-503141 A
PTL 4: JP 2000-086857 A

SUMMARY OF INVENTION

Technical Problem

Accordingly, an object of the present invention is to provide: such a copolymer of a conjugated diene compound and a non-conjugated olefin that is used for manufacturing rubber having good crack growth resistance and good weather resistance and that contains a cis-1,4 bond in the conjugated diene unit (the unit derived from the conjugated diene compound), where the conjugated diene unit (the unit derived from the conjugated diene compound) has a cis-1,4 bond content of greater than 70.5% and the non-conjugated olefin (the unit derived from the non-conjugated olefin) is contained in an amount of 10 mol % or more; a rubber composition containing the copolymer; a cross-linked rubber composition obtained by cross-linking the rubber composition; and a tire using the rubber composition or the cross-linked rubber composition.

Solution to Problem

The inventors of the present invention have made intensive studies to achieve the above-described object, and as a result, have reached a finding that when a conjugated diene compound and a non-conjugated olefin are polymerized in the presence of a particular catalyst, the resulting conjugated diene compound/non-conjugated olefin copolymer has a cis-1,4 bond content of greater than 70.5% in the conjugated diene unit (the unit derived from the conjugated diene compound) and the content of the non-conjugated olefin (the unit derived from the non-conjugated olefin) is 10 mol % or more. Based on this, the present invention has been accomplished.

In the copolymer of a conjugated diene compound and a non-conjugated olefin according to the present invention, the conjugated diene unit (the unit derived from the conjugated diene compound) has a cis-1,4 bond content of greater than 70.5% and the non-conjugated olefin (the unit derived from the non-conjugated olefin) is contained in an amount of 10 mol % or more.

As used herein, the term "cis-1,4 bond content" means the proportion of 1,4-cis bonds in the conjugated diene units in the conjugated diene compound (the unit derived from the conjugated diene compound).

This copolymer more preferably contains the non-conjugated olefin (the unit derived from the non-conjugated olefin) in an amount of 50 mol % or less, and still more preferably the non-conjugated olefin (the unit derived from the non-conjugated olefin) in an amount of less than 20 mol %.

Besides, the copolymer preferably has a molecular weight distribution (Mw/Mn) of 10 or less.

In addition, the non-conjugated olefin is preferably an acyclic olefin, more preferably an α-olefin having 2 to 10 carbon atoms, still more preferably at least one selected from a group consisting of ethylene, propylene and 1-butene, most preferably ethylene.

In addition, the conjugated diene compound preferably has 4 to 8 carbon atoms, and more preferably is at least one selected from a group consisting of 1,3-butadiene and isoprene.

A rubber composition according to the present invention includes the copolymer of the present invention.

The rubber composition according to the present invention preferably includes the copolymer in a rubber component.

The rubber composition according to the present invention preferably includes, with respect to 100 parts by mass of the rubber component, a reinforcing filler by 5 parts by mass to 200 parts by mass of, and a crosslinking agent by 0.1 parts by mass to 20 parts by mass.

A crosslinked rubber composition according to the present invention is obtained by crosslinking the rubber composition of the present invention.

A tire according to the present invention is manufactured by using the rubber composition of the present invention or the crosslinked rubber composition of the present invention.

DESCRIPTION OF EMBODIMENTS

The copolymer of a conjugated diene compound and a non-conjugated olefin according to the present invention allows maintenance of good crack growth resistance as well as manufacture of rubber having excellent weather resistance, by controlling the cis-1,4 bond content of the conjugated diene unit (the unit derived from the conjugated diene compound) to be greater than 70.5% and the content of the non-conjugated olefin (the unit derived from the non-conjugated olefin) to be 10 mol % or more.

The present invention will be described in detail below.

In the copolymer of a conjugated diene compound and a non-conjugated olefin according to the present invention, the conjugated diene unit (the unit derived from the conjugated diene compound) has a cis-1,4 bond content of greater than 70.5%, preferably 80% or more, more preferably 90% or more, and the non-conjugated olefin (the unit derived from the non-conjugated olefin) is contained in an amount of 10 mol % or more, preferably 15 mol % or more, more preferably 20 mol % or more.

By controlling the content of the non-conjugated olefin (the unit derived from the non-conjugated olefin) to be 10 mol % or more, rubber having excellent weather resistance may be provided.

The cis-1,4 bond content (cis content) of more than 70.5% results in a lower glass transition temperature, and therefore, good crack growth resistance. In addition, the content of the non-conjugated olefin (the unit derived from the non-conjugated olefin) of 10 mol % or more results in fewer double bonds in the copolymer, and therefore, good weather resistance.

The above-described cis-1,4 bond content represents an amount in the unit derived from the conjugated diene compound, not a proportion relative to the entire copolymer.

On the other hand, a non-conjugated olefin to be used as a monomer, which is a non-conjugated olefin other than the conjugated diene compound, has an excellent heat resistance, and is capable of reducing the proportion of double covalent bonds in the main chain of the copolymer and controlling the crystallinity thereof to thereby increase design freedom as an elastomer.

The non-conjugated olefin is preferably an acyclic olefin, which preferably has 2 to 10 carbon atoms. An α-olefin has a double bond at the α position of an olefin, and therefor allows efficient copolymerization with a conjugated diene. Therefore, preferred examples of the non-conjugated olefin include α-olefins such as: ethylene; propylene; 1-butene; 1-pentene; 1-hexene; 1-heptene; and 1-octene. Of those, ethylene, propylene, 1-butene are more preferred, and ethylene is still more preferred. These non-conjugated olefins may be used alone or in combination of two or more. Here, olefin refers to unsaturated aliphatic hydrocarbon, which is a compound containing at least one carbon-carbon double covalent bond.

In the copolymer of a conjugated diene compound and a non-conjugated olefin of the present invention, the content of the non-conjugated olefin (the unit derived from the non-conjugated olefin) is preferably 50 mol % or less, more preferably less than 20 mol %. The content of the non-conjugated olefin (unit derived from the non-conjugated olefin) falling within the ranges specified above is capable of effectively improving heat resistance, without causing phase separation of the copolymer.

The conjugated diene compound preferably has 4 to 8 carbon atoms. Specific examples of this conjugated diene compound include 1,3-butadiene, isoprene, 1,3-pentadiene, 2,3-dimethylbutadiene, and so on; among these, preferred are 1,3-butadiene and isoprene. In addition, these conjugated diene compounds may be used alone or in a combination of two or more.

The copolymer of the present invention may be prepared by a similar mechanism using any of the above-mentioned specific examples of the conjugated diene compound.

In addition, since the copolymer of the present invention exhibits static crystallinity when containing a block sequence composed of monomeric units of the non-conjugated olefin, it may indicate the excellent mechanical properties, such as breaking strength. Here, the block sequence also includes a multiblock sequence. Further, a block copolymer including a plurality of structures of (X-Y) or of (Y-X) is referred to as multiblock sequence (where X denotes a block sequence including monomer units of a non-conjugated olefin; and Y denotes a block sequence including monomer units of a conjugated diene compound).

The copolymer neither suffer from molecular weight reduction, nor is limited to any particular weight-average molecular weight (Mw). However, from the viewpoint of application to materials with polymeric structure, this copolymer preferably has a weight-average molecular weight (Mw) of preferably 10,000 to 10,000,000, more preferably 10,000 to 1,000,000, still more preferably 50,000 to 600,000. Mw exceeding 10,000,000 may deteriorate formability and workability.

Further, this copolymer preferably has a molecular weight distribution (Mw/Mn) of 10 or less, more preferably 6 or less, which is represented by a ratio of weight-average molecular weight (Mw) to number-average molecular weight (Mn). This is because a molecular weight distribution exceeding 10 leads to nonhomogeneous physical properties.

It should be noted here that the average molecular weigh and the molecular weight distribution may be determined by gel permeation chromatography (GPC) using polystyrene as the standard.

Preferably, the copolymer of a conjugated diene compound and a non-conjugated olefin according to the present invention does not contain an arrangement of successive non-conjugated olefins.

Next, a method capable of manufacturing the copolymer of the present invention will be described in detail below. However, the manufacturing method further described below is by way of example only.

The copolymer of the present invention allows for polymerization of a conjugated diene compound and a non-conjugated olefin in the presence of the following polymerization catalyst or polymerization catalyst composition. It should be noted that any polymerization method may be used, including solution polymerization, suspension polymerization, liquid phase bulk polymerization, emulsion polymerization, gas phase polymerization, solid phase polymerization, and so on. In addition, in the case of using a solvent for polymerization reaction, any solvent may be used that is inert to the polymerization reaction, including, for example, toluene, cyclohexane, n-hexane and mixtures thereof.

The above-described manufacturing method allows for copolymerization of monomers, i.e., a conjugated diene compound and a non-conjugated olefin, as is the case with a normal method of manufacturing polymers by means of coordinated ionic polymerization catalysts, except that the above polymerization catalyst or polymerization catalyst composition is used.

<First Polymerization Catalyst Composition>

An example of the aforementioned polymerization catalyst composition includes a polymerization catalyst composition (hereinafter, also referred to as first polymerization catalyst composition) including at least one complex selected from a group consisting of: a metallocene complex represented by the following general formula (I); a metallocene complex represented by the following general formula (II); and a half metallocene cation complex represented by the following general formula (III):

[Formula 1]

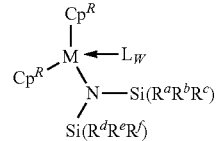

(I)

(In the formula (I), M represents a lanthanoid element, scandium, or yttrium; $Cp^R$ each independently represents an unsubstituted or substituted indenyl group; $R^a$ to $R^f$ each independently represent a hydrogen atom or an alkyl group having 1 to 3 carbon atoms; L represents a neutral Lewis base; and w represents an integer of 0 to 3.);

[Formula 2]

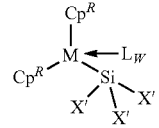

(II)

(In the formula (II), M represents a lanthanoid element, scandium, or yttrium; $Cp^R$ each independently represents an unsubstituted or substituted indenyl group; X' each represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3.); and

[Formula 3]

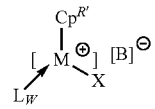

(III)

(In the formula (III), M represents a lanthanoid element, scandium, or yttrium; $Cp^{R'}$ each independently represents an unsubstituted or substituted cyclopentadienyl, indenyl, fluorenyl group; X represents a hydrogen atom, a halogen atom, an alkoxide group, a thiolate group, an amide group, a silyl group, or a hydrocarbon group having 1 to 20 carbon atoms; L represents a neutral Lewis base; w represents an integer of 0 to 3; and [B]⁻ represents a non-coordinating anion.) The first polymerization catalyst composition may further include another component such as a co-catalyst, which is contained in a general polymerization catalyst composition containing a metallocene complex. Here, the metallocene complex is a complex compound having one or more cyclopentadienyl groups or derivative of cyclopentadienyl groups bonded to the central metal. In particular, a metallocene complex may be referred to as half metallocene complex when the number of cyclopentadienyl group or derivative thereof bonded to the central metal is one.

In the polymerization system, the concentration of the complex contained in the first polymerization catalyst composition is preferably defined to fall within a range of 0.1 mol/L to 0.0001 mol/L.

In the metallocene complex represented by the general formulae (I) and (II) above, $Cp^R$ in the formulae represents an unsubstituted or substituted indenyl group. $Cp^R$ having an indenyl ring as a basic skeleton may be represented by $C_9H_{7-X}R_X$ or $C_9H_{11-X}R_X$. Here, X represents an integer of 0 to 7 or 0 to 11. R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. On the other hand, examples of metalloid in the metalloid group include germyl (Ge), stannyl (Sn), and silyl (Si). In addition, the metalloid group preferably has a hydrocarbyl group which is similar to the hydrocarbyl group described above. Specific examples of the metalloid group include a trimethylsilyl group. Specific examples of the substituted indenyl group include 2-phenyl indenyl, 2-methyl indenyl, and 1-methyl-2-phenyl indenyl group. Two $Cp^R$ in the general formulae (I) and (II) may be the same as or different from each other.

In the half metallocene cation complex represented by the general formula (III), $Cp^{R'}$ in the formula represents a substituted or unsubstituted cyclopentadienyl, indenyl, or fluorenyl group, with the substituted or unsubstituted indenyl group being preferred. $Cp^{R'}$ having a cyclopentadienyl ring as a basic skeleton is represented by $C_5H_{5-X}R_X$. Here, X represents an integer of 0 to 5. Further, R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a propyl group, a phenyl group, and a benzyl group. Examples of metalloid in the metalloid group include germyl (Ge), stannyl (Sn), and silyl (Si). In addition, the metalloid group preferably has a hydrocarbyl group which is similar to the hydrocarbyl group described above. Specific examples of the metalloid group include a trimethylsilyl group. $Cp^{R'}$ having a cyclopentadienyl ring as a basic skeleton is specifically exemplified as follows.

[Formula 4]

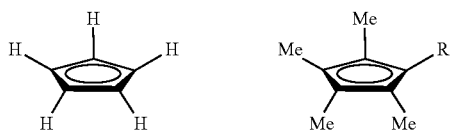

(In the formula, R represents a hydrogen atom, a methyl group, or an ethyl group.)

In the general formula (III), $Cp^{R'}$ having an indenyl ring as a basic skeleton is defined as the same as $Cp^R$ in the general formula (I), and preferred examples thereof are also the same as those of $Cp^R$ in the general formula (I).

In the general formula (III), $Cp^{R'}$ having the fluorenyl ring above as a basic skeleton may be represented by $C_{13}H_{9-X}R_X$ or $C_{13}H_{17-X}R_X$. Here, X represents an integer of 0 to 9 or 0 to 17. R independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. On the other hand, examples of metalloid in the metalloid group include germyl (Ge), stannyl (Sn), and silyl (Si). In addition, the metalloid group preferably has a hydrocarbyl group which is similar to the hydrocarbyl group described above. A specific example of the metalloid group includes a trimethylsilyl group.

The central metal represented by M in the general formulae (I), (II), and (III) represents a lanthanoid element, scandium, or yttrium. The lanthanoid elements include 15 elements with atomic numbers 57 to 71, and may be any one of them. Preferred examples of the central metal represented by M include samarium (Sm), neodymium (Nd), praseodymium (Pr), gadolinium (Gd), cerium (Ce), holmium (Ho), scandium (Sc), and yttrium (Y).

The metallocene complex represented by the general formula (I) includes a silyl amide ligand represented by [—N(SiR$_3$)$_2$]. Groups represented by R ($R^a$ to $R^f$ in the general formula (I)) in the silyl amide ligand each independently represent a hydrogen atom or an alkyl group having 1 to 3 carbon atoms, and it is preferred that at least one of $R^a$ to $R^f$ represents a hydrogen atom. With at least one of $R^a$ to $R^f$ representing a hydrogen atom, the catalyst can be synthesized with ease, and the height around silicon can be reduced, to thereby allow the non-conjugated olefin to be easily introduced. Based on the same objective, it is further preferred that at least one of $R^a$ to $R^c$ represents a hydrogen atom, and at least one of $R^d$ to $R^f$ represents a hydrogen atom. Additionally, a methyl group is preferred as the alkyl group.

The metallocene complex represented by the general formula (II) includes a silyl ligand represented by [—SiX'$_3$]. X' in the silyl ligand represented by [—SiX'$_3$] is a group defined as the same as X in the general formula (III) described below, and preferred examples thereof are also the same as those of X in the general formula (III).

In the general formula (III), X represents a group selected from a group consisting of a hydrogen atom, a halogen atom, an alkoxide group, a thiolate group, an amide group, a silyl group, and a hydrocarbon group having 1 to 20 carbon atoms. In the general formula (III), the alkoxide group represented by X may be any one of aliphatic alkoxy groups such as a methoxy group, an ethoxy group, a propoxy group, an n-butoxy group, an isobutoxy group, a sec-butoxy group, and a tert-butoxy group; and aryl oxide groups (aromatic alkoxy groups) such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group, with the 2,6-di-tert-butylphenoxy group being preferred.

In the general formula (III), the thiolate group represented by X may be any one of: aliphatic thiolate groups such as a thiomethoxy group, a thioethoxy group, a thiopropoxy group, a thio-n-butoxy group, a thioisobutoxy group, a thio-sec-butoxy group, and a thio-tert-butoxy group; and aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group, with the 2,4,6-triisopropylthiophenoxy group being preferred.

In the general formula (III), the amide group represented by X may be any one of: aliphatic amide groups such as a dimethyl amide group, a diethyl amide group, and a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tert-butylphenyl amide group; and bistrialkylsilyl amide groups such as a bistrimethylsilyl amide group, with the bistrimethylsilyl amide group being preferred.

In the general formula (III), the silyl group represented by X may be any one of a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group, with the tris(trimethylsilyl)silyl group being preferred.

In the general formula (III), the halogen atom represented by X may be any one of a fluorine atom, a chlorine atom, a bromine atom, and an iodine atom, with the chlorine atom and the iodine atom being preferred. Specific examples of the hydrocarbon group having 1 to 20 carbon atoms include: linear or branched aliphatic hydrocarbon groups such as a methyl group, an ethyl group, an n-propyl group, an isopropyl group, an n-butyl group, an isobutyl group, a sec-butyl group, a tert-butyl group, a neopentyl group, a hexyl group, and an octyl group; aromatic hydrocarbon groups such as a phenyl group, a tolyl group, and a naphthyl group; aralkyl groups such as a benzyl group; and hydrocarbon groups such as a trimethylsilylmethyl group and a bistrimethylsilylmethyl group each containing a silicon atom, with the methyl group, the ethyl group, the isobutyl group, the trimethylsilylmethyl group, and the like being preferred.

In the general formula (III), the bistrimethylsilyl amide group and the hydrocarbon group having 1 to 20 carbon atoms are preferred as X.

In the general formula (III), examples of the non-coordinating anion represented by [B]⁻ include tetravalent boron anions. Examples of the tetravalent boron anion include tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, (tripheyl, pentafluorophenyl)borate, [tris(pentafluorophenyl), phenyl]borate, and tridecahydride-7,8-dicarbaundecaborate, with the tetrakis(pentafluorophenyl)borate being preferred.

The metallocene complexes represented by the general formulae (I) and (II) and the half metallocene cation complex represented by the general formula (III) may include 0 to 3, preferably 0 or 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When a plurality of neutral Lewis bases represented by L are incorporated, respective L may be the same as or different from each other.

The metallocene complexes represented by the general formulae (I) to (II), and the half metallocene cation complex represented by the general formula (III) may be each present as a monomer or as a dimer or a multimer having more monomers.

The metallocene complex represented by the general formula (I) can be obtained by, for example, subjecting a lanthanoid trishalide, a scandium trishalide, or a yttrium trishalide to reaction in a solvent with a salt of indenyl (for example, a potassium salt or a lithium salt) and a salt of bis(trialkylsilyl) amide (for example, a potassium salt or a lithium salt). The reaction temperature only needs to be set to about room temperature, and thus the complex can be manufactured in mild conditions. In addition, reaction time is arbitrary, but about several hours to several tens of hours. A reaction solvent is not particularly limited, with a solvent that solves a raw material and a product being preferred, and for example, toluene may be used. In the following, a reaction example for obtaining the complex represented by the general formula (I) is described.

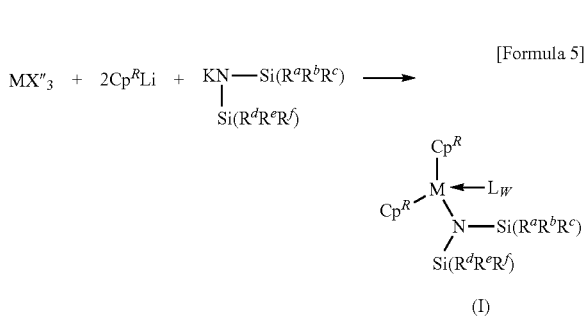

[Formula 5]

(In the Formula, X″ represents a halide.)

The metallocene complex represented by the general formula (II) can be obtained by, for example, subjecting a lanthanoid trishalide, a scandium trishalide, or a yttrium trishalide to reaction in a solvent with a salt of indenyl (for example, a potassium salt or a lithium salt) and a salt of silyl (for example, a potassium salt or a lithium salt). The reaction temperature only needs to be set to about room temperature, and thus the complex can be manufactured in mild conditions. In addition, reaction time is arbitrary, but about several hours to several tens of hours. A reaction solvent is not particularly limited, with a solvent that solves a raw material and a product being preferred, and for example, toluene may be used. In the following, a reaction example for obtaining the complex represented by the general formula (II) is described.

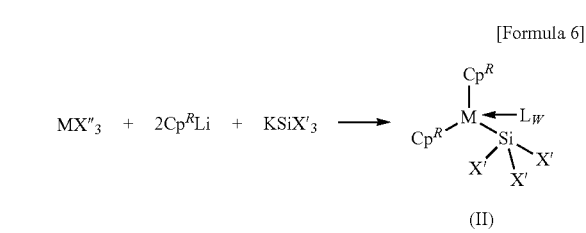

[Formula 6]

(In the Formula, X″ represents a halide.)

The half metallocene cation complex represented by the general formula (III) can be obtained by, for example, the following reaction:

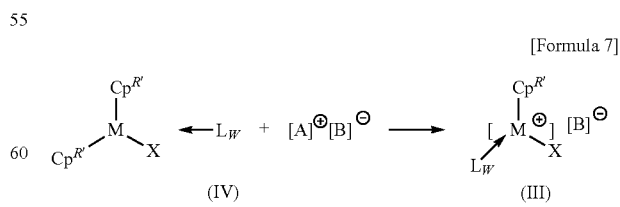

[Formula 7]

In the general formula (IV) representing a compound: M represents a lanthanoid element, scandium, or yttrium; $Cp^{R'}$ independently represents an unsubstituted or substituted cyclopentadienyl, indenyl, or fluorenyl; X represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3. Further, in the general formula $[A]^+[B]^-$ representing an ionic compound, $[A]^+$ represents a cation; and $[B]^-$ represents a non-coordinating anion.

Examples of the cation represented by $[A]^+$ include a carbonium cation, an oxonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation. Specific examples of the tri(substituted phenyl)carbonium cation include a tri(methylphenyl)carbonium cation. Examples of the amine cation include: trialkylammonium cations such as a trimethylammonium cation, a triethylammonium cation, a tripropylammonium cation, and a tributylammonium cation; N,N-dialkylanilinium cations such as a N,N-dimethylanilinium cation, a N,N-diethylanilinium cation, and a N,N-2,4,6-pentamethylanilinium cation; and dialkylammonium cations such as a diisopropylammonium cation and a dicyclohexylammonium cation. Examples of the phosphonium cation include triarylphosphonium cations such as a triphenylphosphonium cation, a tri(methylphenyl)phosphonium cation, and a tri(dimethylphenyl)phosphonium cation. Of those cations, the N,N-dialkylanilinium cations or the carbonium cations are preferred, and the N,N-dialkylanilinium cations are particularly preferred.

In the general formula $[A]^+[B]^-$ representing the ionic compound to be used in the above reaction is a compound obtained by combining any one selected from the non-coordinating anions described above and any one selected from the cations described above. Preferred examples thereof include N,N-dimethylanilinium tetrakis(pentafluorophenyl)borate and triphenylcarbonium tetrakis(pentafluorophenyl)borate. The ionic compound represented by the general formula $[A]^+[B]^-$ is added in an amount of preferably 0.1-fold mol to 10-fold mol and more preferably about 1-fold mol, with respect to the metallocene complex. When the half metallocene cation complex represented by the general formula (III) is used in polymerization reaction, the half metallocene cation complex represented by the general formula (III) may be directly supplied to the polymerization system, or alternatively, the compound represented by the general formula (IV) and the ionic compound represented by the general formula $[A]^+[B]^-$ may be separately supplied to the polymerization system, to thereby form the half metallocene cation complex represented by the general formula (III) in the reaction system. In addition, the half metallocene cation complex represented by the general formula (III) may be formed in the reaction system by using the metallocene complex represented by the general formula (I) or (II) and the ionic compound represented by the general formula $[A]^+[B]^-$ in combination.

Structures of the metallocene complex represented by the general formula (I) or (II) and of the half metallocene cation complex represented by the general formula (III) is preferably determined by X-ray crystallography.

The co-catalyst that can be contained in the first polymerization catalyst composition may be arbitrarily selected from components used as the co-catalyst for the general polymerization catalyst composition containing a metallocene complex. Preferred examples of the co-catalyst include aluminoxanes, organic aluminum compounds, and the above ionic compounds. These co-catalysts may be contained alone or in combination of two or more.

The aluminoxane is preferably an alkyl aluminoxane. Examples of the alkyl aluminoxane include methyl aluminoxane (MAO) and modified methyl aluminoxanes. In addition, preferred examples of the modified methyl aluminoxane include MMAO-3A (manufactured by Tosoh Finechem Corporation). A content of the aluminoxane in the first polymerization catalyst composition is preferably about 10 to 1,000, more preferably about 100, at an element ratio (Al/M) of the aluminum element Al of the aluminoxane to the central metal element M in the metallocene complex.

On the other hand, a preferred example of the organic aluminum compounds may include an organic aluminum compound represented by a general formula AlRR'R" (where R and R' each independently represent a hydrocarbon group of $C_1$ to $C_{10}$ or a hydrogen atom, and R" is a hydrocarbon group of $C_1$ to $C_{10}$). Examples of the organic aluminum compound include a trialkyl aluminum, a dialkyl aluminum chloride, an alkyl aluminum dichloride, and a dialkyl aluminum hydride, with the trialkyl aluminum being preferred. In addition, examples of the trialkyl aluminum include triethyl aluminum and triisobutyl aluminum. A content of the organic aluminum compound in the first polymerization catalyst composition is preferably 2-fold mol to 50-fold mol and more preferably about 10-fold mol, with respect to the metallocene complex.

In the first polymerization catalyst composition, the metallocene complex represented by the general formulae (I) and (II) and the half metallocene complex represented by the general formula (III) may be combined with an appropriate co-catalyst, to thereby increase the cis-1,4 bond content and the molecular weight of a copolymer to be obtained.

<Second Polymerization Catalyst Composition>

Another preferred example of the aforementioned polymerization catalyst composition may include:

a polymerization catalyst composition (hereinafter, also referred to as second polymerization catalyst composition) containing:

component (A): a rare earth element compound or a reactant of a rare earth element compound and a Lewis base, with no bond formed between the rare earth element and carbon;

component (B): at least one selected from a group consisting of: an ionic compound (B-1) composed of a non-coordinating anion and a cation; an aluminoxane (B-2); and at least one kind of halogen compound (B-3) from among a Lewis acid, a complex compound of a metal halide and a Lewis base, and an organic compound containing active halogen. Further, if the polymerization catalyst composition contains at least one kind of the ionic compound (B-1) and the halogen compound (B-3), the polymerization catalyst composition further contains:

component (C): an organic metal compound represented by the following general formula (X):

(where Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, with a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table).

The above-described second polymerization catalyst composition used in the method of manufacturing the copolymer is required to contain the above-described components (A) and (B), and if the polymerization catalyst composition contains at least one of the above-described ionic compound (B-1) and halogen compound (B-3), then it is further required to contain an organometallic compound represented by the following formula:

component (C) represented by the following general formula (X):

$$YR^1_a R^2_b R^3_c \quad (X)$$

(where Y is a metal selected from group 1, group 2, group 12 and group 13 of the periodic table; $R^1$ and $R^2$ each represent a hydrocarbon group having 1 to 10 carbon atoms or a hydrogen atom, the $R^1$ and $R^2$ being the same as or different from each other; and $R^3$ is a hydrocarbon group having 1 to 10 carbon atoms, in which $R^3$ may be the same as or different from $R^1$ and/or $R^2$, and furthermore, if Y is a metal selected from group 1 of the periodic table, then a is 1 and b and c are 0, if Y is metal selected from group 2 and group 12 of the periodic table, then a and b are 1 and c is 0, and if Y is a metal selected from group 13 of the periodic table, then a, b and c are 1). The ionic compound (B-1) and the halogen compound (B-3) do not have carbon atoms to be fed to the component (A), and thus the component (C) becomes necessary as a source of feeding carbon to the component (A). Here, the polymerization catalyst composition still may include the component (C) even if the polymerization catalyst composition includes the aluminoxane (B-2). Further, the second polymerization catalyst composition may further include another component such as a co-catalyst, which is contained in a general rare earth element compound-based polymerization catalyst composition.

The component (A) contained in the second polymerization catalyst composition is a rare earth element compound or a reactant of the rare earth element compound and a Lewis base. Here, a rare earth element compound or a reactant of the rare earth element compound and a Lewis base do not have a direct bond of the rare earth element and carbon. When the rare earth element compound or a reactant thereof does not have a direct bond of a rare earth element and carbon, the resulting compound is stable and easy to handle. Here, the rare earth element compound refers to a compound containing a lanthanoid element, scandium, or yttrium. The lanthanoid elements include elements with atomic numbers 57 to 71 of the periodic table. Specific examples of the lanthanoid element include lanthanum, cerium, praseodymium, neodymium, promethium, samarium, europium, gadolinium, terbium, dysprosium, holmium, erbio, tulio, itterbio, and lutezio. These components (A) may be contained alone or in combination of two or more.

The rare earth element compound is preferably composed of a rare earth metal of a bivalent or trivalent salt or of a complex compound, and further preferably a rare earth element compound containing at least one ligand selected from a hydrogen atom, a halogen atom, and an organic compound residue. Further, the rare earth element compound or the reactant of the rare earth element compound and the Lewis base is represented by the following general formula (XI) or (XII):

$$M^{11}X^{11}_2 \cdot L^{11}_w \quad (XI)$$

$$M^{11}X^{11}_3 \cdot L^{11}_w \quad (XII)$$

(where: $M^{11}$ represents a lanthanoid element, scandium, or yttrium; $X^{11}$ each independently represent a hydrogen atom, a halogen atom, an alkoxy group, a thiolate group, an amide group, a silyl group, an aldehyde residue, a ketone residue, a carboxylic acid residue, a thicarboxylic acid residue, or a phosphorous compound residue; $L^{11}$ represents a Lewis base; and w represents 0 to 3).

Specific examples of a group (ligand) to form a bond to the rare earth element of the rare earth element compound include: a hydrogen atom; aliphatic alkoxy groups such as a methoxy group, an ethoxy group, a propoxy group, an n-butoxy group, an isobutoxy group, a sec-butoxy group, and a tert-butoxy group; aromatic alkoxy groups such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group; aliphatic thiolate groups such as thiomethoxy group, a thioethoxy group, a thiopropoxy group, a thio-n-butoxy group, a thioisobutoxy group, a thio-sec-butoxy group, and a thio-tert-butoxy group; aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group; aliphatic amide groups such as a dimethyl amide group, a diethyl amide group, a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tert-butylphenyl amide group; bis-trialkylsilyl amide groups such as a bistrimethylsilyl amide group; silyl groups such as a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group; halogen atoms such as a fluorine atom, a chlorine atom, a bromine atom, and an iodine atom. Other examples may include: residues of aldehyde such as salicylaldehyde, 2-hydroxy-1-naphthaldehyde, and 2-hydroxy-3-naphthaldehyde; residues of hydroxyphenone such as 2'-hydroxyacetophenone, 2'-hydroxybutyrophenone, and 2'-hydroxypropiophenone; residues of diketone such as acetylacetone, benzoylacetone, propionylaceton, isobutyl acetone, valerylacetone, and ethylacetylacetone; residues of an carboxylic acid such as an isovaleric acid, a caprylic acid, an octanoic acid, a lauric acid, a myristic acid, a palmitic acid, a stearic acid, an isostearic acid, an oleic acid, a linoleic acid, a cyclopentanecarboxylic acid, a naphthenic acid, an ethylhexanoic acid, a pivalic acid, a versatic acid (trade name of a product manufactured by Shell Chemicals Japan Ltd., a synthetic acid composed of a mixture of C10 monocarboxylic acid isomers), a phenylacetic acid, a benzoic acid, 2-naphthoate acid, a maleic acid, and a succinic acid; residues of thicarboxylic acid such as a hexanethioic acid, 2,2-dimethylbutanethioic acid, a decanethioic acid, and a thiobenzoic acid; residues of phosphoric acid ester such as a phosphoric acid dibutyl, a phosphoric acid dipentyl, a phosphoric acid dihexyl, a phosphoric acid diheptyl, a phosphoric acid dioctyl, phosphoric acid bis(2-ethylhexyl), a phosphoric acid bis(1-methylheptyl), a phosphoric acid dilauryl, a phosphoric acid dioleyl, a phosphoric acid diphenyl, a phosphoric acid bis(p-nonylphenyl), a phosphoric acid bis(polyethylene glycol-p-nonylphenyl), a phosphoric acid (butyl)(2-ethylhexyl), a phosphoric acid(1-methylheptyl)(2- ethylhexyl), and a phosphoric acid(2-ethylhexyl)(p-nonylphenyl); residues of phosphonic acid ester such as a 2-ethylhexyl phosphonic acid monobutyl, a 2-ethylhexyl phosphonic acid mono-2-ethylhexyl, a phenylphosphonic acid mono-2-ethylhexyl, a 2-ethylhexyl phosphonic acid mono-p-nonylphenyl, a phosphonic acid mono-2-ethylhexyl, a phosphonic acid mono-1-methylheptyl, a and phosphonic acid mono-p-nonylphenyl; residues of phosphinic acid such as a dibutylphosphinic acid, a bis(2-ethylhexyl)phosphinic acid, a bis(1-methylheptyl)phosphinic acid, a dilauryl phosphinic acid, a dioleyl phosphinic acid, a diphenyl phosphinic acid, a bis(p-nonylphenyl)phosphinic acid, a butyl(2-ethylhexyl)phosphinic acid, (2-ethylhexyl)(2-methylhexyl)(1-methylheptyl)phosphinic acid, an (2-ethylhexyl)(p-nonylphenyl)phosphinic acid, a butyl phosphinic acid, 2-ethylhexyl phosphinic acid, a 1-methylheptyl phosphinic acid, an oleyl phosphinic acid, a lauryl phosphinic acid, a phenyl phosphinic acid, and a p-nonylphenyl phosphinic acid. These ligands may be used alone or in combination of two or more. Of those, amide groups, which easily form active species through reaction with co-catalyst, are preferred.

As to the component (A) used in the second polymerization catalyst composition, examples of the Lewis base to react with the rare earth element compound may include: tetrahydrofuran; diethyl ether; dimethylaniline; trimethylphosphine; lithium chloride, neutral olefins, and neutral diolefins. Here, in the case where the rare earth element compound reacts with a plurality of Lewis bases (in the case where w is 2 or 3 in Formulae (XI) and (XII), the Lewis base $L^{11}$ in each Formula may be the same as or different from each other.

The component (B) contained in the second polymerization catalyst composition is at least one compound selected from a group consisting of: an ionic compound (B-1); an aluminoxane (B-2); and a halogen compound (B-3). The total content of the component (B) contained in the second polymerization catalyst composition is preferably defined to fall within a range of 0.1-fold mol to 50-fold mol, with respect to the component (A).

The ionic compound represented by (B-1) is formed of non-coordinating anion and cation, and an example thereof includes: an ionic compound that reacts with the rare earth element compound as the component (A) or with the reactant resulting from Lewis base and the rare earth element compound, so as to form a cationic transition metal compound. Here, examples of the non-coordinating anion include: tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl) borate, tetra(xylyl)borate, (tripheyl, pentafluorophenyl) borate, [tris(pentafluorophenyl), phenyl]borate, and tridecahydride-7,8-dicarbaundecaborate. Meanwhile, examples of the cation may include a carbonium cation, an oxonium cation, an ammonium cation, a phosphonium cation, a cycloheptatrienyl cation, and a ferrocenium cation containing a transition metal. Specific examples of the carbonium cation include trisubstituted carbonium cations such as a triphenylcarbonium cation and a tri(substituted phenyl)carbonium cation, and more specific examples of the tri(substituted phenyl)carbonium cation include a tri(methylphenyl) carbonium cation and a tri(dimethylphenyl)carbonium cation. Examples of the ammonium cation include: trialkylammonium cations such as a trimethylammonium cation, a triethylammonium cation, a tripropylammonium cation, and a tributylammonium cation (such as a tri(n-butyl)ammonium cation); N,N-dialkylanilinium cations such as a N,N-dimethylanilinium cation, N,N-diethylanilinium cation, and a N,N-2,4,6-pentamethylanilinium cation; and dialkylammonium cations such as a diisopropylammonium cation and a dicyclohexylammonium cation. Specific examples of the phosphonium cation include triarylphosphonium cations such as a triphenylphosphonium cation, a tri(methylphenyl) phosphonium cation, and a tri(dimethylphenyl)phosphonium cation. Therefore, the ionic compound may preferably be a compound obtained by combining any one selected from the non-coordinating anions described above and any one selected from the cations described above. Specific examples thereof preferably include a N,N-dimethylanilinium tetrakis (pentafluorophenyl)borate and a triphenylcarbonium tetrakis (pentafluorophenyl)borate. These ionic compounds may be contained alone or in combination of two or more. The content of the ionic compound in the second polymerization catalyst composition is preferably 0.1-fold mol to 10-fold mol, and more preferably about 1-fold mol, with respect to the component (A).

The aluminoxane represented by (B-2) is a compound obtained by contacting an organic aluminum compound with a condensation agent, and examples thereof include: a chain type aluminoxane or a cyclic aluminoxane, both having a repeating unit represented by the general formula (—Al(R')O—) (where R' is a hydrocarbon group having 1 to 10 carbon atoms and may be partly substituted with halogen atom and/or alkoxy group, and the polymerization degree of the repeating unit is preferably at least 5, more preferably at least 10). Here, specific examples of R' include a methyl group, an ethyl group, a propyl group, and isobutyl group, with the methyl group being preferred. Further, examples of the organic aluminum compound used as a raw material of the aluminoxane may include: trialkyl aluminums such as trimethyl aluminum, triethyl aluminum, triisobutyl aluminum and the like; and mixtures thereof, with the trimethyl aluminum being particularly preferred. For example, an aluminoxane obtained using, as a raw material, a mixture of trimethyl aluminum and tributyl aluminum can be suitably used. The content of aluminoxane in the second polymerization catalyst composition is preferably about 10 to 1,000 at an element ratio (Al/M) of the aluminum element Al of the aluminoxane to the rare earth element M forming the component (A).

The halogen compound represented by (B-3) includes at least one of: a Lewis acid; a complex compound of a metal halide and a Lewis base; and an organic compound containing active halogen, and is capable of reacting with, for example, the rare earth element compound as the component (A) or with the reactant resulting from Lewis base and the rare earth element compound, so as to form a compound, such as a cationic transition metal compound, halogenated transition metal compound or a compound with a charge-deficient transition metal center. The content of the halogen compound in the second polymerization catalyst composition is preferably 1-fold mol to 5-fold mol, with respect to the component (A).

Examples of the Lewis acid may include: a boron-containing halogen compound such as $B(C_6F_5)_3$ and an aluminum-containing halogen compound such as $Al(C_6F_5)_3$, and may also include a halogen compound containing an element of Group III, Group IV, Group V, Group VI, and Group VIII of the periodic table. Preferred examples thereof include an aluminum halide or an organometallic halide. Preferred examples of the halogen element include chlorine and bromine. Specific examples of the Lewis acid include: a methyl aluminum dibromide; a methyl aluminum dichloride; an ethyl aluminum dibromide; an ethyl aluminum dichloride; a butyl aluminum dibromide; a butyl aluminum dichloride; a dimethyl aluminum bromide; a dimethyl aluminum chloride;

a diethyl aluminum bromide; a diethyl aluminum chloride; a dibutyl aluminum bromide; a dibutyl aluminum chloride; a methyl aluminum sesquibromide; a methyl aluminum sesquichloride; a ethyl aluminum sesquibromide; an ethyl aluminum sesquichloride; a dibutyltin dichloride; an aluminum tribromide; an antimony trichloride; an antimony pentachloride; a phosphorus trichloride; a phosphorus pentachloride; a tin tetrachloride; a titanium tetrachloride; and tungsten hexachloride, with the diethyl aluminum chloride, the ethyl aluminum sesquichloride, the ethyl aluminum dichloride, the diethyl aluminum bromide, the ethyl aluminum sesquibromide, and the ethyl aluminum dibromide being particularly preferred.

Preferred examples of the metal halide forming a complex compound of the metal halide and a Lewis base include: a beryllium chloride, a beryllium bromide; a beryllium iodide; a magnesium chloride; a magnesium bromide; a magnesium iodide; a calcium chloride; a calcium bromide; a calcium iodide; a barium chloride; a barium bromide; a barium iodide; a zinc chloride; a zinc bromide; a zinc iodide; a cadmium chloride; a cadmium chloride; a cadmium bromide; a cadmium iodide; a mercury chloride; a mercury bromide; a mercury iodide; a manganese chloride; a manganese bromide; a manganese iodide; a rhenium chloride; a rhenium bromide; a rhenium iodide; a copper chloride; a copper bromide; a copper iodide; a silver chloride; a silver bromide; a silver iodide; a gold chloride; a gold iodide; and a gold bromide, with the magnesium chloride, the calcium chloride, the barium chloride, the manganese chloride, the zinc chloride, and the copper chloride being preferred, and the magnesium chloride, the manganese chloride, the zinc chloride, and the copper chloride being particularly preferred.

Preferred examples of the Lewis base forming a complex compound of the metal halide and the Lewis base include: a phosphorus compound; a carbonyl compound; a nitrogen compound; an ether compound; and an alcohol. Specific examples thereof include: a tributyl phosphate; a tri-2-ethylhexyl phosphate; a triphenyl phosphate; a tricresyl phosphate; a triethylphosphine; a tributylphosphine; a triphenylphosphine; a diethylphosphinoethane; an acetylacetone; a benzoylacetone; a propionitrileacetone; a valerylacetone; an ethylacetylacetone; a methyl acetoacetate; an ethyl acetoacetate; a phenyl acetoacetate; a dimethyl malonate; a diphenyl malonate; an acetic acid; an octanoic acid; a 2-ethylhexoic acid; an oleic acid; a stearic acid; a benzoic acid; a naphthenic acid; a versatic acid; a triethylamine; a N,N-dimethylacetamide; a tetrahydrofuran; a diphenyl ether; a 2-ethylhexyl alcohol; an oleyl alcohol; stearyl alcohol; a phenol; a benzyl alcohol; a 1-decanol; and a lauryl alcohol, with the tri-2-ethylhexyl phosphate, the tricresyl phosphate; the acetylacetone, the 2-ethylhexoic acid, the versatic acid, the 2-ethylhexyl alcohol; the 1-decanol; and the lauryl alcohol being preferred.

The Lewis base is subjected to reaction with the metal halide in the proportion of 0.01 mol to 30 mol, preferably 0.5 mol to 10 mol, per 1 mol of the metal halide. The use of the reactant obtained from the reaction of the Lewis base can reduce residual metal in the polymer.

An example of the organic compound containing active halogen includes benzyl chloride.

The component (C) contained in the second polymerization catalyst composition is an organic compound represented by the general formula (X):

$$YR^1_a R^2_b R^3_c \qquad (X)$$

(where Y is a metal selected from Group 1, Group 2, Group 12, and Group 13 of the periodic table; $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above, a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table), and is preferably an organic aluminum compound represented by the general formula (Xa):

$$AlR^1 R^2 R^3 \qquad (Xa)$$

(where $R^1$ and $R^2$ are the same or different hydrocarbon groups each having 1 to 10 carbon atoms or a hydrogen atom; and $R^3$ is a hydrocarbon group having 1 to 10 carbon atoms, in which $R^{13}$ may be the same as or different from $R^{11}$ or $R^{12}$ above). Examples of the organic aluminum compound in the formula (X) include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride, a diisohexyl aluminum hydride, a dioctyl aluminum hydride, a diisooctyl aluminum hydride; an ethyl aluminum dihydride, a n-propyl aluminum dihydride, and an isobutyl aluminum dihydride, with the triethyl aluminum, the triisobutyl aluminum, the diethyl aluminum hydride, and the diisobutyl aluminum hydride being preferred. The organic aluminum compounds as the component (C) may be contained alone or in combination of two or more. The content of the organic aluminum compound in the second polymerization catalyst composition is preferably 1-fold mol to 50-fold mol, and more preferably about 10-fold mol, with respect to the component (A).

<Polymerization Catalyst and Third Polymerization Catalyst Composition>

Examples of the polymerization catalyst include: a metallocene-based composite catalyst which is used for polymerization with the conjugated diene compound and the non-conjugated olefin and is represented by the following formula (A):

$$R_a MX_b QY_b \qquad (A)$$

(where R each independently represents an unsubstituted or substituted indenyl group, the R being coordinated with M; M represents a lanthanoid element, scandium, or yttrium; X each independently represents a hydrocarbon group having 1 to 20 carbon atoms, the X being μ-coordinated with M and Q; Q represents a Group 13 element in the periodic table; Y each independently represents a hydrocarbon group having 1 to 20 carbon atoms or a hydrogen atom, the Y being coordinated with Q; and a and b each are 2).

Preferred examples of the above-described metallocene-based composite catalyst include a metallocene-based composite catalyst represented by the following formula (XV):

[Formula 8]

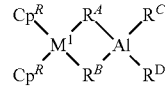

(XV)

(where M¹ is a lanthanoid element, scandium or yttrium; $Cp^R$ is independently a non-substituted or substituted indenyl; $R^a$ and $R^b$ are independently a hydrocarbon group having 1 to 20 carbon atoms, the $R^a$ and $R^b$ each being μ-coordinated with M¹ and Al; and $R^c$ and $R^d$ are independently a hydrocarbon group having 1 to 20 carbon atoms or a hydrogen atom).

In addition, the above-described third polymerization catalyst composition contains the above-described metallocene-based composite catalyst and a boron anion.

<Metallocene-based Composite Catalyst>

The above-described metallocene-based composite catalyst will now be described in detail below. The above-described metallocene-based composite catalyst has a rare earth element of lanthanoid element, scandium or yttrium and an element in group 13 of the periodic table, and is represented by the following formula (A):

$$R_a MX_b QY_b \quad (A)$$

(where R is independently a non-substituted or substituted indenyl and is coordinated to M; M is a lanthanoid element, scandium or yttrium; X is independently a hydrocarbon group having 1 to 20 carbon atoms, the X being μ-coordinated with M and Q; Q is an element in group 13 of the periodic table; Y is independently a hydrocarbon group having 1 to 20 carbon atoms or a hydrogen atom, the Y being coordinated with Q; and a and b are equal to 2). The above-described metallocene-based polymerization catalyst allows for manufacture of a copolymer of a conjugated diene compound and a non-conjugated olefin. The use of the metallocene-based composite compounds such as an aluminum-based catalyst can reduce or eliminate the amount of alkyl aluminum to be used in the step of synthesizing a copolymer. Meanwhile, the use of a conventional catalyst system requires a large amount of alkyl aluminum to be used in synthesizing a copolymer. For example, a conventional catalyst system requires alkyl aluminum of at least 10 equivalents relative to a metal catalyst, whereas the above-described metallocene-based composite catalyst of the present invention can exhibit an excellent catalytic effect through the addition of alkyl aluminum of only about 5 equivalents.

In the metallocene-based composite catalyst, the metal represented by M in the formula (A) is a lanthanoid element, scandium, or yttrium. The lanthanoid elements include 15 elements with atomic numbers 57 to 71, and may be any one of them. Preferred examples of the metal represented by M include samarium (Sm), neodymium (Nd), praseodymium (Pr), gadolinium (Gd), cerium (Ce), holmium (Ho), scandium (Sc), and yttrium (Y).

In the formula (A), R each independently represents an unsubstituted or substituted indenyl, the R being coordinated with the metal M. Specific examples of the substituted indenyl group include a 1,2,3-trimethyl indenyl group, a heptamethyl indenyl group, and a 1,2,4,5,6,7-hexamethyl indenyl group.

In the formula (A), Q represents a Group 13 element in the periodic table. Specific examples thereof include: boron, aluminum, gallium, indium, and thallium.

In the formula (A), X each independently represents a hydrocarbon group having 1 to 20 carbon atoms, the X being μ-coordinated with M and Q. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group. The μ-coordination refers to a state of coordination which forms a crosslinked structure.

In the formula (A), Y each independently represents a hydrocarbon group having 1 to 20 carbon atoms or a hydrogen atom, the Y being coordinated with Q. Here, examples of the hydrocarbon group having 1 to 20 carbon atoms include, a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

In the formula (XV) above, the metal represented by M¹ is a lanthanoid element, scandium, or yttrium. The lanthanoid elements include 15 elements with atomic numbers 57 to 71, and may be any one of them. Preferred examples of the metal represented by M¹ include samarium (Sm), neodymium (Nd), praseodymium (Pr), gadolinium (Gd), cerium (Ce), holmium (Ho), scandium (Sc), and yttrium (Y).

In the formula (XV), $Cp^R$ represents an unsubstituted or substituted indenyl. $Cp^R$ having an indenyl ring as a basic skeleton may be represented by $C_9H_{7-X}R_X$ or $C_9H_{11-X}R_X$. Here, X represents an integer of 0 to 7 or 0 to 11. R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Specific examples of the hydrocarbyl group suitably include a methyl group, an ethyl group, a phenyl group, and a benzyl group. Meanwhile, examples of metalloid in the metalloid group include germyl (Ge), stannyl (Sn), and silyl (Si). In addition, the metalloid group preferably has a hydrocarbyl group, which is similar to the hydrocarbyl group described above. A specific example of the metalloid group is a trimethylsilyl group. Specific examples of the substituted indenyl group include 2-phenyl indenyl and 2-methyl indenyl group. Two $Cp^R$ in the formula (XV) may be the same as or different from each other.

In the formula (XV), $R^A$ and $R^B$ each independently represent a hydrocarbon group having 1 to 20 carbon atoms, the $R^A$ and $R^B$ being μ-coordinated with M¹ and Al. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group. The μ-coordination refers to a state of coordination which forms a crosslinked structure.

In the formula (XV), $R^C$ and $R^D$ each independently represent a hydrocarbon group having 1 to 20 carbon atoms or a hydrogen atom. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

The metallocene-based composite catalyst can be obtained by, for example, reacting with an organic aluminum compound represented by $AlR^K R^L R^M$ in a solvent, the metallocene complex represented by the following formula (XVI):

[Formula 9]

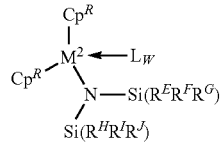

(XVI)

(where, M² represents a lanthanoid element, scandium, or yttrium; $Cp^R$ each independently represents an unsubstituted or substituted indenyl group; $R^E$ to $R^J$ each independently represent an alkyl group having 1 to 3 carbon atoms or a hydrogen atom; L represents a neutral Lewis base; and w represents an integer of 0 to 3.) The reaction may be carried out at temperatures around room temperature, and thus the metallocene-based composite catalyst can be manufactured under mild conditions. The reaction time is arbitrary, and may be about several hours to several tens of hours. The reaction solvent is not particularly limited, and any solvent including, for example, toluene and hexane, which are capable of dissolving the raw material and the product can be preferably used. The structure of the metallocene-based composite catalyst may preferably be determined by $^1$H-NMR or X-ray crystallography.

In the metallocene complex represented by the formula (XVI) above, $Cp^R$ is a non-substituted indenyl or substituted indenyl and has the same meaning as $Cp^R$ in the formula (XV) above. In addition, in the formula (XVI) above, metal $M^2$ is a lanthanoid element, scandium or yttrium and has the same meaning as metal $M^1$ in the formula (XV) above.

The metallocene complex represented by the formula (XVI) above includes a silylamide ligand [—N(SiR$_3$)$_2$]. Each of R groups ($R^E$ to $R^J$ groups) included in the silylamide ligand is independently an alkyl group having 1 to 3 carbon atoms or a hydrogen atom. Also, at least one of $R^E$ to $R^J$ is preferably a hydrogen atom. If at least one of $R^E$ to $R^J$ is a hydrogen atom, it becomes easier to synthesize a catalyst. Moreover, a methyl group is preferred as the alkyl group.

The metallocene complex represented by the formula (XVI) above further contains 0 to 3, preferably 0 or 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When a plurality of neutral Lewis bases represented by L are incorporated, respective L may be the same as or different from each other.

In addition, the metallocene complex represented by the formula (XVI) may be present as a monomer or as a dimer or higher-order multimer.

On the other hand, the organic aluminum compound used for generating the above-described metallocene-based composite catalyst is represented by AlR$^K$R$^L$R$^M$, where R$^K$ and R$^L$ are independently a univalent hydrocarbon group having 1 to 20 carbon atoms or a hydrogen atom, and R$^M$ is a univalent hydrocarbon group having 1 to 20 carbon atoms, in which R$^M$ may be the same as or different from R$^K$ or R$^L$ above. Examples of the univalent hydrocarbon group having 1 to 20 carbon atoms include methyl group, ethyl group, propyl group, butyl group, pentyl group, hexyl group, heptyl group, octyl group, decyl group, dodecyl group, tridecyl group, tetradecyl group, pentadecyl group, hexadecyl group, heptadecyl group, stearyl group, and so on.

Specific examples of the organic aluminum compound include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride; a diisohexyl aluminum hydride, a dioctyl aluminum hydride, a diisooctyl aluminum hydride; an ethyl aluminum dihydride, a n-propyl aluminum dihydride, and an isobutyl aluminum dihydride, with the triethyl aluminum, the triisobutyl aluminum, the diethyl aluminum hydride, and the diisobutyl aluminum hydride being preferred. These organic aluminum compounds may be contained alone or in combination of two or more. The content of the organic aluminum compound to be used for generating the metallocene-based composite catalyst is preferably 1-fold mol to 50-fold mol, and more preferably about 10-fold mol, with respect to the metallocene complex.

<Third Polymerization Catalyst Composition>

Preferred examples of the polymerization catalyst composition includes the above-described metallocene-based composite catalyst and boron anion. Furthermore, this polymerization catalyst composition preferably includes another component such as a co-catalyst, which is contained in a general polymerization catalyst composition containing a metallocene-based catalyst. Here, the third polymerization catalyst composition is also referred to two-component catalyst, which has the metallocene-based composite catalyst and boron anion. As is the case with the metallocene-based composite catalyst, the third polymerization catalyst composition further contains boron anion, which allows the content of each monomer component in the copolymer to be arbitrarily controlled.

In the third polymerization catalyst composition, a specific example of the boron anion forming the two-component catalyst includes a tetravalent boron anion. Examples thereof may include: a tetraphenyl borate, a tetrakis(monofluorophenyl) borate, a tetrakis(difluorophenyl)borate, a tetrakis(trifluorophenyl)borate, a tetrakis(tetrafluorophenyl)borate, a tetrakis(pentafluorophenyl)borate, a tetrakis(tetrafluoromethylphenyl)borate, a tetra(tolyl)borate, a tetra(xylyl)borate, a (tripheyl, pentafluorophenyl)borate, a [tris(pentafluorophenyl), phenyl]borate, and a tridecahydride-7,8-dicarbaundecaborate, with the tetrakis(pentafluorophenyl)borate being preferred.

The boron anion may be used as an ionic compound combined with cation. Examples of the cation include a carbonium cation, an oxonium cation, an ammonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation, and more specifically, an example of the tri(substituted phenyl)carbonium cation includes a tri(methylphenyl)carbonium cation. Examples of the amine cation include: trialkylammonium cations such as a trimethylammonium cation, a triethylammonium cation, a tripropylammonium cation, and a tributylammonium cation; N,N-dialkylanilinium cations such as a N,N-dimethylanilinium cation, a N,N-diethylanilinium cation, and a N,N-2,4,6-pentamethylanilinium cation; and dialkylammonium cations such as a diisopropylammonium cation and a dicyclohexylammonium cation. Specific examples of the phosphonium cation include triarylphosphonium cations such as a triphenylphosphonium cation, a tri(methylphenyl)phosphonium cation, and a tri(dimethylphenyl)phosphonium cation. Of those cations, the N,N-dialkylanilinium cations or the carbonium cations are preferred, and the N,N-dialkylanilinium cations are particularly preferred. Therefore, preferred examples of the ionic compound include a N,N-dimethylanilinium tetrakis (pentafluorophenyl)borate and a triphenylcarbonium tetrakis (pentafluorophenyl)borate. The content of the ionic compound including a boron anion and a cation may preferably be added by 0.1-fold mol to 10-fold mol, and more preferably by about 1-fold mol, with respect to the metallocene-based composite catalyst.

While it is required to use the above-described metallocene-based composite catalyst and the above-described boron anion in the above-described third polymerization catalyst composition, if a boron anion is present in the reaction system in which the metallocene catalyst represented by the formula (XVI) above is reacted with the organic aluminum compound, it is not possible to synthesize the metallocene-based composite catalyst of the formula (XV) above. Accordingly, preparation of the above-described third polymerization catalyst composition requires the metallocene-based composite catalyst to be synthesized in advance and isolated and purified before combined with a boron anion.

Preferred examples of the co-catalyst that can be contained in the third polymerization catalyst composition may include an organic aluminum compound represented by the $AlR^K R^L R^M$, and also include an aluminoxane. The aluminoxane is preferably an alkyl aluminoxane, examples of which include methyl aluminoxane (MAO) and modified methyl aluminoxane. In addition, preferred examples of the modified methyl aluminoxane include MMAO-3A (manufactured by Tosoh Finechem Corporation). These aluminoxanes may be contained alone or in combination of two or more.

In the method of manufacturing the copolymer, as described above, polymerization may be performed using a general coordination ion polymerization catalyst similarly to a conventional method of manufacturing a copolymer, except for the use of the above-described polymerization catalyst or polymerization catalyst composition. Here, the method of manufacturing the copolymer can be performed in either one of the following manners. That is, for example, (1) the components forming the polymerization catalyst composition may be separately provided in the polymerization reaction system including, as monomers, a conjugated diene compound and a conjugated olefin other than the conjugated diene compound, to thereby produce the polymerization catalyst composition in the reaction system, or (2) the polymerization catalyst composition prepared in advance may be provided into the polymerization reaction system. Further, the method of (2) also includes providing the metallocene complex (active species) activated by the co-catalyst. The amount of the metallocene complex to be contained in the polymerization catalyst composition is preferably set to fall within a range of 0.0001-fold mol to 0.01-fold mol with respect to the total amount of the conjugate diene compound and the non-conjugated olefin other than the conjugate diene compound.

Further, in the method of manufacturing the copolymer, a terminator such as methanol, ethanol or isopropanol may be used to stop the polymerization.

In the method of manufacturing the copolymer, the polymerization reaction of the conjugated diene compound and the non-conjugated olefin may preferably be performed in an inert gas atmosphere, and preferably in nitrogen or argon atmosphere. The polymerization temperature of the polymerization reaction is not particularly limited, and preferably in a range of, for example, −100° C. to 200° C., and may also be set to temperatures around room temperature. An increase in polymerization temperature may reduce the cis-1,4-selectivity in the polymerization reaction. The polymerization reaction is preferably performed under pressure in a range of 0.1 MPa to 10.0 MPa so as to allow a conjugated diene compound and a non-conjugated olefin to be sufficiently introduced into the polymerization system. Further, the reaction time of the polymerization reaction is not particularly limited, and may preferably be in a range of, for example, 1 second to 10 days, which may be selected as appropriate depending on the conditions such as the type of the monomers to be polymerized, the type of the catalyst, and the polymerization temperature.

In the method of manufacturing the copolymer according to the invention, when the above-described conjugated diene compound is polymerized with the non-conjugated olefin other than the conjugated diene compound, a pressure of the non-conjugated olefin is preferably 0.1 MPa to 10 MPa. If the pressure of the non-conjugated olefin is 0.1 MPa or more, it is possible to efficiently introduce the non-conjugated olefin into the reaction mixture. In addition, if the pressure of the non-conjugated olefin is excessively high, the effect attained by efficient introduction of the non-conjugated olefin reaches a peak. Therefore, the pressure of the non-conjugated olefin is preferably 10 MPa or less.

According to the above-described method of manufacturing the copolymer, in polymerizing a conjugated diene compound and a non-conjugated olefin other than the conjugated diene compound, the concentration of the conjugated diene compound (mol/L) and the concentration of the non-conjugated olefin (mol/L) at the start of copolymerization preferably satisfy the following relation:

the concentration of the non-conjugated olefin/the concentration of the conjugated diene compound ≥1.0;

further preferably satisfy the following relation:

the concentration of the non-conjugated olefin/the concentration of the conjugated diene compound ≥1.3; and still further preferably satisfy the following relation:

the concentration of the non-conjugated olefin/the concentration of the conjugated diene compound ≥1.7.

The ratio of the concentration of the non-conjugated olefin to the concentration of the conjugated diene compound is defined to be at least 1, to thereby efficiently introduce the non-conjugated olefin into the reaction mixture.

(Rubber Composition)

The rubber composition of the present invention is not particularly limited as long as the copolymer of the present invention is contained, and may be selected as appropriate depending on the application thereof. The rubber composition preferably contains rubber components other than the copolymer of the present invention, such as an inorganic filler, a carbon black, and a crosslinking agent.

<Copolymer>

The content of the copolymer of the present invention in the rubber components is not particularly limited, and may be selected as appropriate depending on the application thereof. The preferred content of the copolymer is at least 3 mass %.

The content of the copolymer in the rubber components falling short of 3 mass % may diminish the effect of the present invention or develop no effect at all.

<Rubber Components>

The rubber components are not particularly limited and may be selected as appropriate depending on the application thereof. Examples thereof include: the copolymer of the present invention, natural rubber, various types of butadiene rubber, various types of styrene-butadiene copolymer rubber, isoprene rubber, butyl rubber, a bromide of a copolymer of isobutylene and p-methylstyrene, halogenated butyl rubber, acrylonitrile-butadiene rubber, chloroprene rubber, ethylene-propylene copolymer rubber, ethylene-propylene-diene copolymer rubber, styrene-isoprene copolymer rubber, styrene-isoprene-butadiene copolymer rubber, isoprene-butadiene copolymer rubber, chlorosulfonated polyethylene rubber, acrylic rubber, epichlorohydrin rubber, polysulfide rubber, silicone rubber, fluororubber, and urethane rubber. These rubber components may be used alone or in combination of two or more.

The rubber composition may be mixed with a reinforcing filler as necessary. Examples of the reinforcing filler include a carbon black and an inorganic filler, and preferably at least one selected from the carbon black and the inorganic filler.

<Inorganic Filler>

The inorganic filler is not particularly limited and may be selected as appropriate depending on the application thereof.

Examples thereof include silica, aluminum hydroxide, clay, alumina, talc, mica, kaolin, glass balloon, glass beads, calcium carbonate, magnesium carbonate, magnesium hydroxide, magnesium oxide, titanium oxide, potassium titanate, and barium sulfate. These rubber components may be used alone or in combination of two or more. In using an inorganic filler, a silane coupling agent may also be used as appropriate.

The content of the reinforcing filler is not particularly limited and may be selected as appropriate depending on the application thereof. The preferred content thereof is 5 parts by mass to 200 parts by mass with respect to 100 parts by mass of the rubber component.

The reinforcing filler added by less than 5 parts by mass in content may show little effect of the addition thereof, whereas the content exceeding 200 parts by mass tends to hinder the reinforcing filler to be mixed into the rubber component, which may impairs the performance of the rubber composition.

<Crosslinking Agent>

The crosslinking agent is not particularly limited and may be selected as appropriate depending on the application thereof. Examples thereof include a sulfur-containing crosslinking agent, an organic peroxide-containing crosslinking agent, an inorganic crosslinking agent, a polyamine crosslinking agent, a resin crosslinking agent, a sulfur compound-based crosslinking agent, an oxime-nitrosamine-based crosslinking agent, and sulfur, with the sulfur-containing crosslinking agent being more preferred as the rubber composition for a tire.

The content of the crosslinking agent is not particularly limited and may be selected as appropriate depending on the application thereof. The preferred content thereof is 0.1 parts by mass to 20 parts by mass with respect to 100 parts by mass of the rubber component.

The crosslinking agent added by less than 0.1 parts by mass in content may hardly develop crosslinking, whereas the content exceeding 20 parts by mass tends to develop crosslinking by part of the crosslinking agent during the mixing, or to impair the physical property of the vulcanizate.

<Other Components>

Other than the above, a vulcanization accelerator may also be contained. Examples of compounds that can be used as the vulcanization accelerator include: guanidine-based compounds, aldehyde-amine-based compounds, aldehyde-ammonia-based compounds, thiazole-based compounds, sulfenamide-based compounds, thiourea-based compounds, thiuram-based compounds, dethiocarbamate-based compounds, and xanthate-based compounds.

Further, if necessary, any known agent such as a reinforcing agent, a softening agent, a co-agent, a colorant, a flame retardant, a lubricant, a foaming agent, a plasticizer, a processing aid, an antioxidant, an age resister, an anti-scorch agent, an ultraviolet rays protecting agent, an antistatic agent, a color protecting agent, and other compounding agent may be used according to the purpose of use thereof.

(Crosslinked Rubber Composition)

The crosslinked rubber composition according to the present invention is not particularly limited as long as being obtained by crosslinking the rubber composition of the present invention, and may be selected as appropriate depending on the application thereof.

The conditions of the crosslinking are not particularly limited and may be selected as appropriate depending on the application thereof. The preferred conditions of temperature and heating time for the crosslinking may preferably be in a range of 120° C. to 200° C. for 1 minute to 900 minutes.

(Tire)

A tire of the present invention is not particularly limited as long as being manufactured by using the rubber composition of the present invention or the crosslinked rubber composition of the present invention, and may be selected as appropriate depending on the application thereof. The rubber composition of the present invention or the crosslinked rubber composition of the present invention may be applied, for example, to a tread, a base tread, a sidewall, a side reinforcing rubber, and a bead filler of a tire, without being limited thereto.

The tire can be manufactured by a conventional method. For example, a carcass layer, a belt layer, a tread layer, which are composed of unvulcanized rubber, and other members used for the production of usual tires are successively laminated on a tire molding drum, then the drum is withdrawn to obtain a green tire. Thereafter, the green tire is heated and vulcanized in accordance with an ordinary method, to thereby obtain a desired tire.

(Applications Other than Tires)

The rubber composition of the present invention or the crosslinked rubber composition of the present invention may be used for other applications than tires, such as anti-vibration rubber, seismic isolation rubber, a belt (conveyor belt), a rubber crawler, various types of hoses, and moran.

EXAMPLES

In the following, the invention of the present invention is described with reference to Examples. However, the present invention is no way limited to the following Examples.

(Copolymer A)

Firstly, 325 mL of a toluene solution containing 13.58 g (0.25 mol) of 1,3-butadiene was added to a 400 mL pressure-resistant grass reactor that had been sufficiently dried, and then ethylene was introduced thereto at 0.4 MPa. Meanwhile, in a glovebox under a nitrogen atmosphere, 18.0 µmol of bis(2-phenylindenyl)gadolinium bis(dimethylsilylamide) [(2-PhC$_9$H$_6$)$_2$GdN(SiHMe$_2$)$_2$], 36.0 µmol of dimethylanilinium tetrakis(pentafluorophenyl)borate (Me$_2$NHPhB (C$_6$F$_5$)$_4$), and 0.90 mmol of diisobutylaluminum hydride were provided in a glass container, which was dissolved into 10 mL of toluene, to thereby obtain a catalyst solution. After that, the catalyst solution was taken out from the glovebox and added by 17.5 µmol of gadolinium equivalent to the monomer solution, which was then subjected to polymerization at room temperature for 180 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer A. The yield of the copolymer A thus obtained was 12.00 g.

(Copolymer B)

Firstly, 20 mL of a toluene solution containing 3.38 g (0.063 mol) of 1,3-butadiene was added to a 200 mL pressure-resistant grass reactor that had been sufficiently dried, and then 2.45 g (0.088 mol) of ethylene was introduced thereto. Meanwhile, in a glovebox under a nitrogen atmosphere, 5.5 µmol of bis(2-phenylindenyl)gadolinium bis(dimethylsilylamide) [(2-PhC$_9$H$_6$)$_2$GdN(SiHMe$_2$)$_2$], 11.0 µmol of dimethylanilinium tetrakis(pentafluorophenyl)borate (Me$_2$NHPhB (C$_6$F$_5$)$_4$), and 0.41 mmol of triisobutylaluminum were provided in a glass container, which was dissolved into 10 mL of toluene, to thereby obtain a catalyst solution. After that, the catalyst solution was taken out from the glovebox and added by 17.5 μmol of gadolinium equivalent to the monomer solution, which was then subjected to polymerization at room temperature for 240 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer B. The yield of the copolymer B thus obtained was 4.15 g.

(Copolymer C)

Firstly, 300 mL of a toluene solution containing 18.20 g (0.34 mol) of 1,3-butadiene was added to a 400 mL pressure-resistant grass reactor that had been sufficiently dried, and then ethylene was introduced thereto at 0.8 MPa. Meanwhile, in a glovebox under a nitrogen atmosphere, 34.0 μmol of trisbistrimethylsilylamide gadolinium [Gd[N(SiMe$_3$)$_2$]$_3$], 41.0 μmol of dimethylanilinium tetrakis(pentafluorophenyl)borate (Me$_2$NHPhB(C$_6$F$_5$)$_4$), and 1.19 mmol of triisobutylaluminum were provided in a glass container, which was dissolved into 8 mL of toluene, to thereby obtain a catalyst solution. After that, the catalyst solution was taken out from the glovebox and added by 33.7 μmol of gadolinium equivalent to the monomer solution, which was then subjected to polymerization at room temperature for 180 minutes. After the polymerization, 1 mL of an isopropanol solution containing, by 5 mass %, 2,2-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer C. The yield of the copolymer C thus obtained was 29.50 g.

(Copolymer D)

Firstly, 300 mL of a toluene solution containing 23.79 g (0.44 mol) of 1,3-butadiene was added to a 400 mL pressure-resistant grass reactor that had been sufficiently dried, and then ethylene was introduced thereto at 0.8 MPa. Meanwhile, in a glovebox under a nitrogen atmosphere, 500.0 μmol of trisbisdimethylsilylamide scandium [(Sc[N(SiHMe$_2$)$_2$]$_3$-(THF)$_2$], 600 μmol of Me$_2$NHPhB(C$_6$F$_5$)$_4$, and 10.0 mmol of diisobutylaluminum hydride were provided in a glass container, which was dissolved into 25 mL of toluene, to thereby obtain a catalyst solution. After that, the catalyst solution was taken out from the glovebox and added by 440 μmol of neodymium equivalent to the monomer solution, which was then subjected to polymerization at room temperature for 180 minutes. After the polymerization, 1 mL of an isopropanol solution containing, by 5 mass %, NS-5, was added to stop the reaction. Then, a large amount of methanol was further added to isolate the copolymer, and the copolymer was vacuum dried at 70° C. to obtain a copolymer D. The yield of the copolymer D thus obtained was 37.40 g.

(Copolymer E)

Firstly, 320 mL of a toluene solution containing 3.95 g (0.073 mol) of 1,3-butadiene was added to a 400 mL pressure-resistant grass reactor that had been sufficiently dried, and then ethylene was introduced thereto at 0.6 MPa. Meanwhile, in a glovebox under a nitrogen atmosphere, 204.0 μmol of dimethylaluminum(μ-dimethyl)bis(2-phenylindenyl)neodymium [(2-PhC$_9$H$_6$)$_2$Nd(μ-Me)$_2$AlMe$_2$] and 195.0 μmol of triphenylcarbonium tetrakis(pentafluorophenyl)borate (Ph$_3$CB(C$_6$F$_5$)$_4$) were provided in a glass container, which was dissolved into 20 mL of toluene, to thereby obtain a catalyst solution. After that, the catalyst solution was taken out from the glovebox and added to the monomer solution, which was then subjected to polymerization at room temperature for 90 minutes. After the polymerization, 1 mL of an isopropanol solution containing, by 5 mass %, 2,2'-methylene-bis(4-ethyl-6-t-butylphenol) (NS-5), was added to stop the reaction. Then, a large amount of methanol was further added to isolate the copolymer, and the copolymer was vacuum dried at 70° C. to obtain a copolymer E. The yield of the copolymer E thus obtained was 3.60 g.

The copolymers A to E thus obtained were subjected to measurement and evaluation for weight-average molecular weight (Mw), molecular weight distribution (Mw/Mn), cis-1,4 bond content and ethylene content in the following way.

(1) Weight-Average Molecular Weight (Mw) and Molecular Weight Distribution (Mw/Mn)

A polystyrene equivalent weight-average molecular weight (MW) and a molecular weight distribution (Mw/Mn) of each copolymer were obtained through gel permeation chromatography [GPC: HLC-8121GPC/HT (manufactured by Tosoh Corporation), column: two of GMH$_{HR}$-H(S)HT (manufactured by Tosoh Corporation), detector: a differential refractometer (RI)], using monodisperse polystyrene as a reference. The measurement temperature was 140° C.

(2) cis-1,4 Bond Content

The microstructure of the butadiene unit in the copolymer is determined from an integral ratio based on $^1$H-NMR spectrum (1,2-vinyl bond content) and $^{13}$C-NMR spectrum (a ratio of cis-1,4 bond content to trans-1,4 bond content). The calculated values of the cis-1,4 bond content (%) are shown in Table 1.

(3) Ethylene Content

The content (mol %) of the ethylene unit in the copolymer is determined from an integral ratio of an ethylene bond component (28.5 ppm to 30.0 ppm) of the whole to a butadiene bond component (26.5 ppm to 27.5 ppm+31.5 ppm to 32.5 ppm) of the whole, based on $^{13}$C-NMR spectrum (100° C., d-tetrachloroethane standard: 7.38 ppm). The content (mol %) of the ethylene unit is shown in Table 1.

TABLE 1

|  | Copolymer A | Copolymer B | Copolymer C | Copolymer D | Copolymer E |
| --- | --- | --- | --- | --- | --- |
| Mw (×10$^3$) | 338 | 324 | 87 | 58 | 40 |
| Mw/Mn | 1.9 | 2.4 | 5.8 | 15.8 | 1.9 |
| cis-1,4 bond content (%) | 98 | 97 | 86 | 80 | 78 |
| ethylene content (mol %) | 11 | 36 | 50 | 45 | 24 |

As Examples 1 to 4 and Comparative Example 1, the rubber compositions formulated as shown in Table 2 were prepared, while as Example 5 and Comparative Examples 2 and 3, the rubber compositions formulated as shown in Table 3 were prepared. These compositions were vulcanized at 160° C. for 20 minutes. The vulcanized rubber compositions thus obtained were subjected to measurements of crack growth resistance according to the following method.

In Comparative Example 1, polymerization was performed in the same way as Example 2, except that ethylene was not introduced to the copolymer B of Example 2, thereby obtaining a butadiene polymer, the yield of which was 3.38 g.

In Comparative Example 2, polymerization was performed in the same way as Example 5, except that the copolymer E of Example 5 was polymerized at a polymerization temperature of 50° C. for a polymerization time of 30 minutes, thereby obtaining a copolymer F, the yield of which was 3.65 g.

In Comparative Example 3, polymerization was performed in the same way as Example 1, except that ethylene was initially introduced under a pressure of 0.2 MPa, thereby obtaining a copolymer G, the yield of which was 11.05 g.

TABLE 2

|  | parts by mass |
| --- | --- |
| copolymer | 100 |
| stearic acid | 2 |
| carbon black (FEF class) | 50 |

TABLE 2-continued

|  | parts by mass |
| --- | --- |
| age resistor*[1] | 1 |
| zinc oxide | 3 |
| co-agent CZ-G*[2] | 0.4 |
| co-agent DM-P*[3] | 0.2 |
| sulfur | 1.4 |

TABLE 3

|  | parts by mass |
| --- | --- |
| copolymer | 60 |
| natural rubber (NR) | 40 |
| stearic acid | 2 |
| carbon black (FEF class) | 50 |
| age resistor*[1] | 1 |
| zinc oxide | 3 |
| co-agent CZ-G*[2] | 0.4 |
| co-agent DM-P*[3] | 0.2 |
| sulfur | 1.4 |

*[1]N-(1,3-dimethylbutyl)-N'-p-phenylenediamine (NOCRAC 6C), manufactured by OUCHI SHINKO CHEMICAL INDUSTRIAL CO., LTD.
*[2]N-cyclohexyl-2-benzothiazolesulfenamide (NOCCELER CZ-G), manufactured by OUCHI SHINKO CHEMICAL INDUSTRIAL CO., LTD.
*[3]dibenzothiazyl disulfide (NOCCELER DM-P), manufactured by OUCHI SHINKO CHEMICAL INDUSTRIAL CO., LTD.

<<Crack Growth Resistance>>

A 0.5-mm crack was given at the central portion of each JIS No. 3 test specimen. Then, fatigue was repetitively applied to each sample at room temperature under a strain of 0% to 100%, and the number of times it took to rupture the sample by applying the repetitive fatigue was counted for each sample. In Table 4, a butadiene polymer was compounded. The results thereof are shown as being indexed with a score of 100 representing Comparative Example 1. The larger index value shows better crack growth resistance.

In Table 4, ">200" means that the sample was not ruptured despite the repetitive fatigue applied twice as many as those applied to Comparative Example 1.

<<Ozone Resistance (Dynamic)>>

Ozone resistance was measured according to JIS K 6259. Rectangular test specimens were exposed at 40° C. and ozone concentration of 50 pphm under 30% dynamic stretching. Then, the conditions of the samples after 24 hours were visually examined (for cracks). The results thereof are shown in Table 4.

TABLE 4

|  | Example 1 Copolymer A | Example 2 Copolymer B | Example 3 Copolymer C | Example 4 Copolymer D | Example 5 Copolymer E | Comparative Example 1 Bd Polymer | Comparative Example 2 Copolymer F | Comparative Example 3 Copolymer G |
| --- | --- | --- | --- | --- | --- | --- | --- | --- |
| Mw (×10$^3$) | 338 | 324 | 87 | 58 | 40 | 350 | 40 | 340 |
| Mw/Mn | 1.9 | 2.4 | 5.8 | 15.8 | 1.9 | 2.4 | 2.1 | 1.9 |
| cis-1,4 bond content (%) | 98 | 97 | 86 | 80 | 78 | 95 | 66 | 98 |
| ethylene content (mol %) | 11 | 36 | 50 | 45 | 24 | 0 | 25 | 5 |
| crack growth resistance (index) | >200 | >200 | 125 | 114 | 102 | 100 | 95 | 102 |
| cracks due to ozone resistance (dynamic) -24 h- | none | none | none | none | none | large cracks observed over the sample | none | minute cracks observed at ends of the sample |

The invention claimed is:

1. A copolymer of a conjugated diene compound and a non-conjugated olefin, wherein
the copolymer is obtained by polymerization in the presence of a catalyst represented by the following general formula (I):

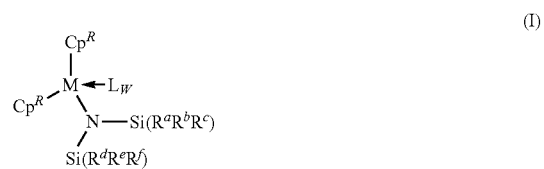

(I)

wherein M represents a lanthanoid element, scandium, or yttrium; $Cp^R$ each independently represents an unsubstituted or substituted indenyl group; $R^a$ to $R^f$ each independently represents a hydrogen atom or an alkyl group having 1 to 3 carbon atoms; at least one of $R^a$ to $R^f$ represents a hydrogen atom; L represents a neutral Lewis base; and w represents an integer of 0 to 3, or the following general formula (XV):

(XV)

wherein $M^1$ represents a lanthanoid element, scandium or yttrium; $Cp^R$ each independently represents an unsubstituted or substituted indenyl group; $R^A$ and $R^B$ each independently represents a hydrocarbon group having 1 to 20 carbon atoms, the $R^A$ and $R^B$ each is μ-coordinated with $M^1$ and Al; and $R^C$ and $R^D$ each independently represents a hydrocarbon group having 1 to 20 carbon atoms or a hydrogen atom, the conjugated diene unit has a cis-1,4 bond content of greater than 70.5% and the non-conjugated olefin is contained in an amount of 10 mol % or more and 50 mol % or less, and the non-conjugated olefin is an acyclic olefin, and the copolymer has a weight-average molecular weight (Mw) of 50,000 to 600,000.

2. The copolymer of a conjugated diene compound and a non-conjugated olefin according to claim 1, wherein the non-conjugated olefin is contained in an amount of less than 20 mol %.

3. The copolymer of a conjugated diene compound and a non-conjugated olefin according to claim 1, wherein the copolymer has a molecular weight distribution (Mw/Mn) of 10 or less.

4. The copolymer of a conjugated diene compound and a non-conjugated olefin according to claim 1, wherein the non-conjugated olefin is an α-olefin having 2 to 10 carbon atoms.

5. The copolymer of a conjugated diene compound and a non-conjugated olefin according to claim 1, wherein the non-conjugated olefin is at least one selected from a group consisting of ethylene, propylene and 1-butene.

6. The copolymer of a conjugated diene compound and a non-conjugated olefin according to claim 5, wherein the non-conjugated olefin is ethylene.

7. The copolymer of a conjugated diene compound and a non-conjugated olefin according to claim 1, wherein the conjugated diene compound has 4 to 8 carbon atoms.

8. The copolymer of a conjugated diene compound and a non-conjugated olefin according to claim 7, wherein the conjugated diene compound is at least one selected from a group consisting of 1,3-butadiene and isoprene.

9. A rubber composition comprising the copolymer according to claim 1.

10. The rubber composition according to claim 9 comprising the copolymer in a rubber component.

11. The rubber composition according to claim 9, comprising, with respect to 100 parts by mass of the rubber component, a reinforcing filler by 5 parts by mass to 200 parts by mass and a crosslinking agent by 0.1 parts by mass to 20 parts by mass.

12. A crosslinked rubber composition obtained by crosslinking the rubber composition according to claim 9.

13. A tire manufactured by using the rubber composition according to claim 9.

14. A tire manufactured by using the crosslinked rubber composition according to claim 12.

* * * * *